United States Patent
Feng

(10) Patent No.: US 12,032,416 B2
(45) Date of Patent: Jul. 9, 2024

(54) FOLDABLE HINGE AND FOLDABLE DISPLAY DEVICE

(71) Applicant: WUHAN CHINA STAR OPTOELECTRONICS SEMICONDUCTOR DISPLAY TECHNOLOGY CO., LTD., Wuhan (CN)

(72) Inventor: Zikang Feng, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 17/606,028

(22) PCT Filed: Sep. 1, 2021

(86) PCT No.: PCT/CN2021/115917
§ 371 (c)(1),
(2) Date: Oct. 23, 2021

(87) PCT Pub. No.: WO2023/015624
PCT Pub. Date: Feb. 16, 2023

(65) Prior Publication Data
US 2024/0028084 A1    Jan. 25, 2024

(30) Foreign Application Priority Data
Aug. 9, 2021  (CN) .......................... 202110909049.9

(51) Int. Cl.
*H05K 1/18* (2006.01)
*E05D 3/12* (2006.01)
(Continued)

(52) U.S. Cl.
CPC ........... *G06F 1/1681* (2013.01); *E05D 3/122* (2013.01); *G09F 9/301* (2013.01); *E05Y 2900/606* (2013.01)

(58) Field of Classification Search
CPC ....... G06F 1/1681; E05D 3/122; G09F 9/301; E05Y 2900/606
(Continued)

(56) References Cited

U.S. PATENT DOCUMENTS

| 10,036,188 | B1 | 7/2018 | Yao et al. |
| 10,664,021 | B1* | 5/2020 | Hsu ........................ G06F 1/1626 |
| 2022/0137676 | A1* | 5/2022 | Tian ....................... G06F 1/1616 |
|  |  |  | 361/679.27 |

FOREIGN PATENT DOCUMENTS

| CN | 110213409 A | 9/2019 |
| CN | 111677747 A | 9/2020 |

(Continued)

OTHER PUBLICATIONS

Chinese Office Action issued in corresponding Chinese Patent Application No. 202110909049.9 dated Mar. 28, 2022, pp. 1-7.
(Continued)

*Primary Examiner* — Binh B Tran
(74) *Attorney, Agent, or Firm* — PV IP PC; Wei Te Chung; Zhigang Ma

(57) ABSTRACT

The present application provides foldable hinge and a foldable display device. The foldable hinge includes a first support plate, wherein the first support plate is provided with at least two opposite arc-shaped grooves; two second support plates located on opposite sides of the first support plate; and at least two rotating mechanisms including a fixed plate fixed on one of the second support plates; and an arc-shaped arm connected to the fixed plate, wherein the arc-shaped arm is at least partially received and slided in the
(Continued)

arc-shaped groove to drive the corresponding second support plate being unfolded or folded relative to the first support plate.

20 Claims, 14 Drawing Sheets

(51) Int. Cl.
*G06F 1/16* (2006.01)
*G09F 9/30* (2006.01)

(58) Field of Classification Search
USPC .......................................................... 361/749
See application file for complete search history.

(56) References Cited

FOREIGN PATENT DOCUMENTS

| CN | 111692196 A | 9/2020 |
|----|-------------|--------|
| CN | 111698355 A | 9/2020 |
| CN | 112153188 A | 12/2020 |
| CN | 112762090 A | 5/2021 |
| CN | 113067923 A | 7/2021 |
| JP | 2014072884 A | 4/2014 |

OTHER PUBLICATIONS

International Search Report in International application No. PCT/CN2021/115917, mailed on Apr. 25, 2022.
Written Opinion of the International Searching Authority in International application No. PCT/CN2021/115917, mailed on Apr. 25, 2022.

* cited by examiner

FOLDABLE HINGE AND FOLDABLE DISPLAY DEVICE

RELATED APPLICATIONS

This application is a Notional Phase of PCT Patent Application No. PCT/CN2021/115917 having international filing date of Sep. 1, 2021, which claims the benefit of priority of Chinese Patent Application No. 202110909049.9 filed on Aug. 9, 2021. The contents of the above applications are all incorporated by reference as if fully set forth herein in their entirety.

FIELD OF INVENTION

The present application relates to a foldable screen technology field, and particularly to a foldable hinge and a foldable display device.

BACKGROUND

With demands for thinner and miniaturized display devices (e.g. foldable mobile phones, etc.), foldable display devices have emerged. At present, foldable display devices have become a major development in the display field, and foldable display devices are generally folded through a hinge. However, before and after folding, the hinge in the prior art cannot always match a size of a flexible screen, so that the flexible screen will be greatly stretched during a folding process, which will impact a lifespan of the flexible screen.

Therefore, there is a need for a solution to make the hinge that always matches the size of the flexible screen, so as avoid the flexible screen from being greatly stretched during the folding process.

SUMMARY OF DISCLOSURE

In order to solve above problems, technical solutions provided by the present application are as follows.

The present application provides a foldable hinge, comprising:
- a first support plate, wherein the first support plate is provided with at least two opposite arc-shaped grooves;
- two second support plates located on opposite sides of the first support plate; and
- at least two rotating mechanisms, wherein each of the rotating mechanisms comprises:
- a fixed plate, wherein one end of the fixed plate away from the arc-shaped arm is fixed on one of the second support plates; and
- an arc-shaped arm connected to the fixed plate, wherein the arc-shaped arm is at least partially received and slided in the arc-shaped groove to drive the corresponding second support plate being unfolded or folded relative to the first support plate.

Optionally, in one embodiment of the present application, the first support plate comprises:
- a first main body, wherein the first main body is provided with at least two opposite first receiving grooves; and
- at least two limiting blocks, wherein each limiting block is fixed in one of the first receiving grooves, and a gap between each limiting block and an inner wall of the first receiving groove forms the arc-shaped groove.

Optionally, in one embodiment of the present application, the foldable hinge further comprises at least one linkage mechanism, wherein the linkage mechanism comprises two linkage arms and a synchronous gear assembly, the synchronous gear assembly is fixed on the first support plate, and the synchronous gear assembly comprises two synchronous gears meshing with each other, wherein:
- one end of each of the linkage arms is slidably connected to one of the second support plates on the same side, the other end each of the linkage arms is fixedly connected to the corresponding synchronous gear, and the two linkage arms rotate synchronously with the synchronous gear.

Optionally, in one embodiment of the present application, the ends of the two linkage arms away from the second support plate abut against each other.

Optionally, in one embodiment of the present application, an end surface of each of the linkage arms away from the second support plate is arc-shaped.

Optionally, in one embodiment of the present application, each of the second support plates is provided with a sliding groove, an end of each of the linkage arms away from the first support plate is embedded in the sliding groove and is able to slide in the sliding groove under driving of the synchronous gear.

Optionally, in one embodiment of the present application, each of the linkage arms comprises a linkage portion and two convex portions oppositely disposed at an end of the linkage portion away from the first support plate,
- wherein two guide ribs are provided on two sidewalls of the sliding groove, the two guide ribs respectively extend oppositely from the two sidewalls, an opening is formed between the two guide ribs, a first sub-sliding groove is formed between one of the guide ribs and a bottom wall of the sliding groove, and a second sub-sliding groove is formed between the other one of the guide ribs and the bottom wall; and
- wherein the two convex portions are respectively received in the first sub-sliding groove and the second sub-sliding groove, an end of the linkage portion away from the first support plate is received in the opening, the linkage portion is able to slide in the opening, and each convex portion is able to slide in the corresponding first sub-sliding groove or the second sub-sliding groove.

Optionally, in one embodiment of the present application, a second receiving groove is further provided on the first support plate, and the synchronous gear assembly further comprises:
- two gear brackets arranged oppositely, wherein the two gear brackets are fixed on the inner wall of the second receiving groove; and
- two fixed shafts, wherein both ends of the fixed shafts are respectively rotatably connected to the two gear brackets, each of the synchronous gears is fixedly connected to one of the fixed shafts, and one of the linkage arms is fixedly connected to one of the correspond fixed shafts.

Optionally, in one embodiment of the present application, each of the linkage mechanisms further comprises a driving member, and the driving member is connected to one of the synchronous gears and is used to drive the synchronous gear to rotate.

Optionally, in one embodiment of the present application, each of the first receiving grooves comprises:
- a longitudinal groove extending in a first direction; and
- a transverse groove extending in a second direction, wherein the longitudinal groove crosses the transverse groove, an inner wall at a cross-section of the longitudinal groove and the transverse groove is arc-shaped, and the limiting block is received and fixed in the longitudinal groove, wherein each of the limiting blocks comprises a first surface facing the inner wall of the first receiving groove, the first surface is an arc-shaped surface, the arc-shaped inner wall of the first receiving groove and the arc-shaped first surface of the first limiting block constitutes two arc-shaped surfaces of the arc-shaped groove.

Optionally, in one embodiment of the present application, each of the limiting block further comprises an outer surface opposite to the first surface, the outer surface of the limiting block is arc-shaped, the outer surface of the first support plate is arc-shaped, an arc of the outer surface of the limiting block is consistent with an arc of the outer surface of the first support plate, and the outer surface of the stop block is level with the outer surface of the first support plate.

Optionally, in one embodiment of the present application, the arc-shaped groove is provided with two openings on the outer surface of the first support plate, and one end of the arc-shaped arm enters the arc-shaped groove.

Optionally, in one embodiment of the present application, an arc of the arc-shaped arm is the same as an arc of the arc-shaped groove, and a rotation center of the arc-shaped arm is a center of the arc-shaped groove.

Optionally, in one embodiment of the present application, the foldable hinge further comprises two bottom side plates and a bottom plate, each of the bottom side plates is fixed on one of the second support plates and covers the sliding groove and the fixed plate, and the bottom plate is fixed on the first support plate and covers the second receiving groove.

The present application further provides a foldable display device, comprising:
 a foldable hinge, comprising:
  a first support plate, wherein the first support plate is provided with at least two opposite arc-shaped grooves;
  two second support plates located on opposite sides of the first support plate; and
  at least two rotating mechanisms, wherein each of the rotating mechanisms comprises:
  a fixed plate, wherein one end of the fixed plate away from the arc-shaped arm is fixed on one of the second support plates; and
  an arc-shaped arm connected to the fixed plate, wherein the arc-shaped arm is at least partially received and slided in the arc-shaped groove to drive the corresponding second support plate being unfolded or folded relative to the first support plate;
 a flexible screen located on one side of the foldable hinge, wherein the flexible screen comprises a bending area, and the foldable hinge is facing the bending area; and
 a shell, wherein the flexible screen and the foldable hinge are respectively fixed on the shell.

Optionally, in one embodiment of the present application, the foldable display device further comprises a gasket located between the flexible screen and the foldable hinge.

The present application provides a foldable hinge and a foldable display device. The foldable hinge comprises a first support plate and two second support plates located on both sides of the first support plate. The at least one set of two rotating mechanisms is connected to the two second support plates and the first support plate. At least one set of two arc-shaped grooves are provided on the first support plate. Each rotating mechanism comprises an arc-shaped arm, and the arc-shaped arm received in the arc-shaped groove can be slided in the arc-shaped groove, and the arc-shaped groove on the first support plate matches with the arc-shaped arm of the rotating mechanism, so that the foldable hinge can always match the size of the flexible screen, thereby avoiding the flexible screen from being stretched by the foldable hinge during the folding or unfolding process, which increases the lifespan of the flexible screen.

In addition, each second support plate is provided with at least one sliding groove, the foldable hinge further comprises a linkage mechanism, and the linkage mechanism comprises a linkage arm and a synchronous gear assembly, and the two linkage arms are fixedly connected to the synchronous gear assembly The other end of the linkage arm is slidably connected in the sliding groove and can slide in the sliding groove. The two oppositely arranged linkage arms are driven to always rotate symmetrically through the synchronous gear assembly, and then the other end of the linkage arm is matched with the sliding groove. The sliding connection relationship enables the two second support plates on both sides of the first support plate to always maintain symmetrical rotation.

BRIEF DESCRIPTION OF DRAWINGS

In order to more clearly illustrate technical solutions in embodiments of the present disclosure, a brief description of accompanying drawings used in a description of the embodiments will be given below. Obviously, the accompanying drawings in the following description are merely some embodiments of the present disclosure. For those skilled in the art, other drawings may be obtained from these accompanying drawings without creative labor.

DETAILED DESCRIPTION

Figure 1:
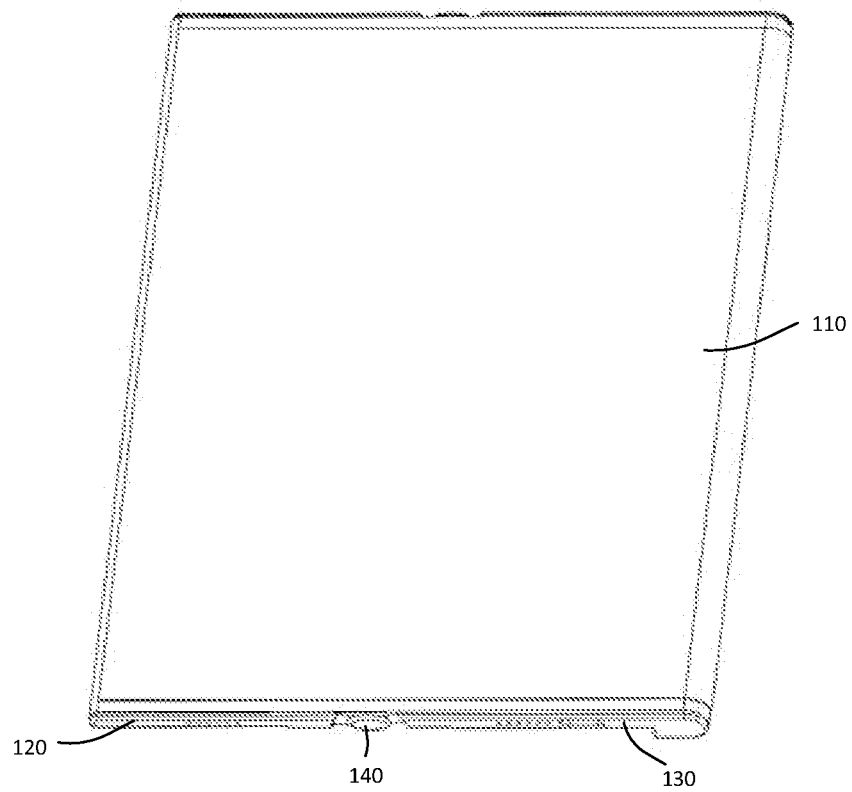
FIG. 1 is a schematic diagram of a foldable display device in an unfolded state provided by the present application.

The technical solutions in the embodiments of the present application will be clearly and completely described below in conjunction with the drawings in the embodiments of the present application. Obviously, the described embodiments are only a part of the embodiments of the present application, rather than all the embodiments. Based on the embodiments in the present application, all other embodiments obtained by those skilled in the art without creative work shall fall within the protection scope of the present application.

In the description of the present application, it should be understood that orientation or positional relationship indicated by the terms "upper", "lower", etc. is based on the orientation or positional relationship shown in the drawings, and is only for the convenience of describing the application and simplifying the description. It does not indicate or imply that the pointed device or element must have a specific orientation, be configured and operated in a specific orientation, and therefore cannot be understood as a limitation of the present application. In addition, the terms "first" and "second" are only used for descriptive purposes, and cannot be understood as indicating or implying relative importance or implicitly indicating the number of indicated technical features. Therefore, the features defined with "first" and "second" may explicitly or implicitly include one or more of the features. In the description of the present application, "plurality" means two or more, unless otherwise specifically defined.

The present application may repeat reference numerals and/or reference letters in different implementations, and this repetition is for the purpose of simplification and clarity, and does not itself indicate the relationship between the various embodiments and/or settings discussed.

The present application addresses the technical problem that a hinge of an existing foldable display device does not always match a size of a flexible screen, so that the flexible screen will be greatly stretched during a folding process, which will damage a lifespan of the flexible screen. Therefore, a foldable hinge of the present application is designed to comprise a first support plate and two second support plates located on opposite sides of the first support plate. The two second support plates and the first support plate are connected through at least two rotating mechanisms, and at least two arc-shaped grooves are provided on the first support plate. Each rotating mechanism comprises an arc-shaped arm, and the arc-shaped arm is received and slided in the arc-shaped groove. The arc-shaped groove on the first support plate and the arc-shaped arm of the rotating mechanism cooperates with each other, so that the foldable hinge can always match a size of the flexible screen, so as to prevent the flexible screen from being stretched by the foldable hinge during folding or unfolding processes and extend a lifespan of the flexible screen.

The foldable hinge and foldable display device of the present application will be described in detail below in conjunction with specific embodiments.

Figure 2:
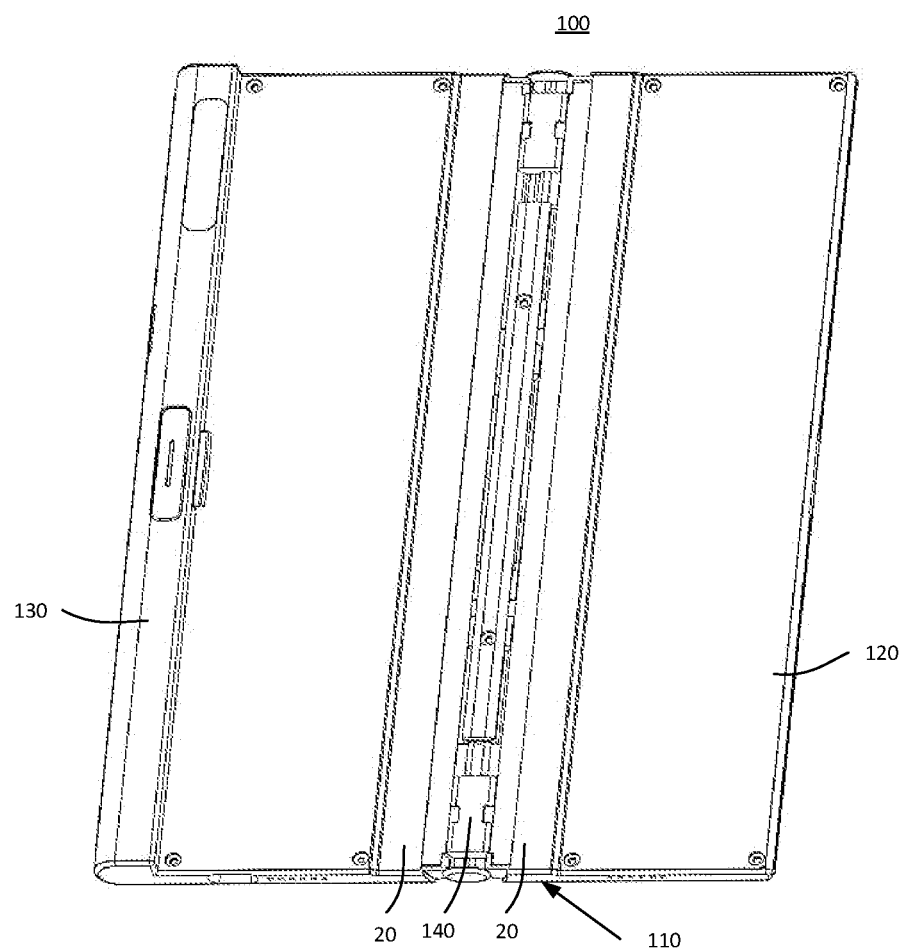
FIG. 2 is a schematic diagram of a foldable display device at another angle in an unfolded state provided by the present application.
Figure 3:
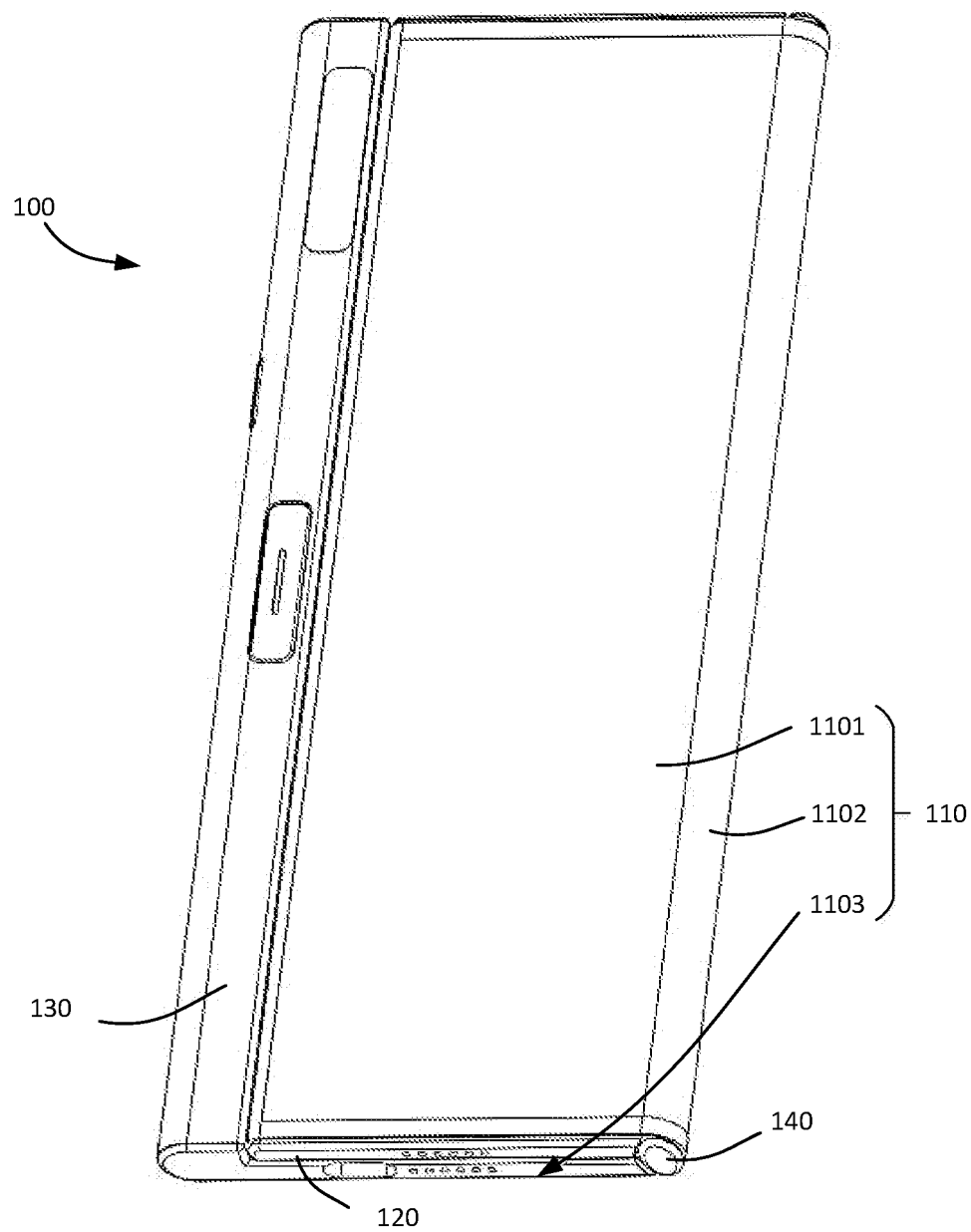
FIG. 3 is a schematic diagram of a foldable display device in a folded state provided by the present application.

Please refer to FIGS. 1-3. An embodiment of the present application provides a foldable display device 100. The foldable display device 100 may be a foldable display device such as a mobile phone, a computer, or a display screen. In this embodiment, the foldable display device 100 is a foldable mobile phone.

Herein, the foldable display device 100 comprises a flexible screen 110, a first housing 120, a second housing 130, and a foldable hinge 140. Herein, one end of the flexible screen 110 and the foldable hinge 140 are respectively fixed on the first housing 120, and the other end of the flexible screen 110 and the foldable hinge 140 are respectively fixed on the second housing 130. The flexible screen 110 is located above the foldable hinge 140. The foldable hinge 140 supports the flexible screen 110, and the foldable hinge 140 can drive the first housing 120 and the second housing 130 to fold or unfold relative to each other, thereby driving the flexible screen 110 to fold or unfold towards each other.

Specifically, referring to FIG. 3 again, the flexible screen 110 comprises a first non-bending area 1101, a bending area 1102, and a second non-bending area 1103. The first non-bending area 1101 and the second non-bending area 1103 are located at two ends of the bending area 1102 and connected to the bending area 1102 respectively. The foldable hinge 140 corresponds to the bending area 1102, a portion of the first non-bending area 1101 and a portion of the second non-bending area 1103. In this embodiment, the flexible screen 110 is an outward foldable flexible screen, so that the foldable display device 100 can also display when it is in a folded state.

Herein, FIG. 4 to FIG. 14 are schematic diagrams of a structure of the foldable hinge 140. The structure of the foldable hinge 140 will be described in detail below in conjunction with FIG. 4 to FIG. 15.

Figure 4:
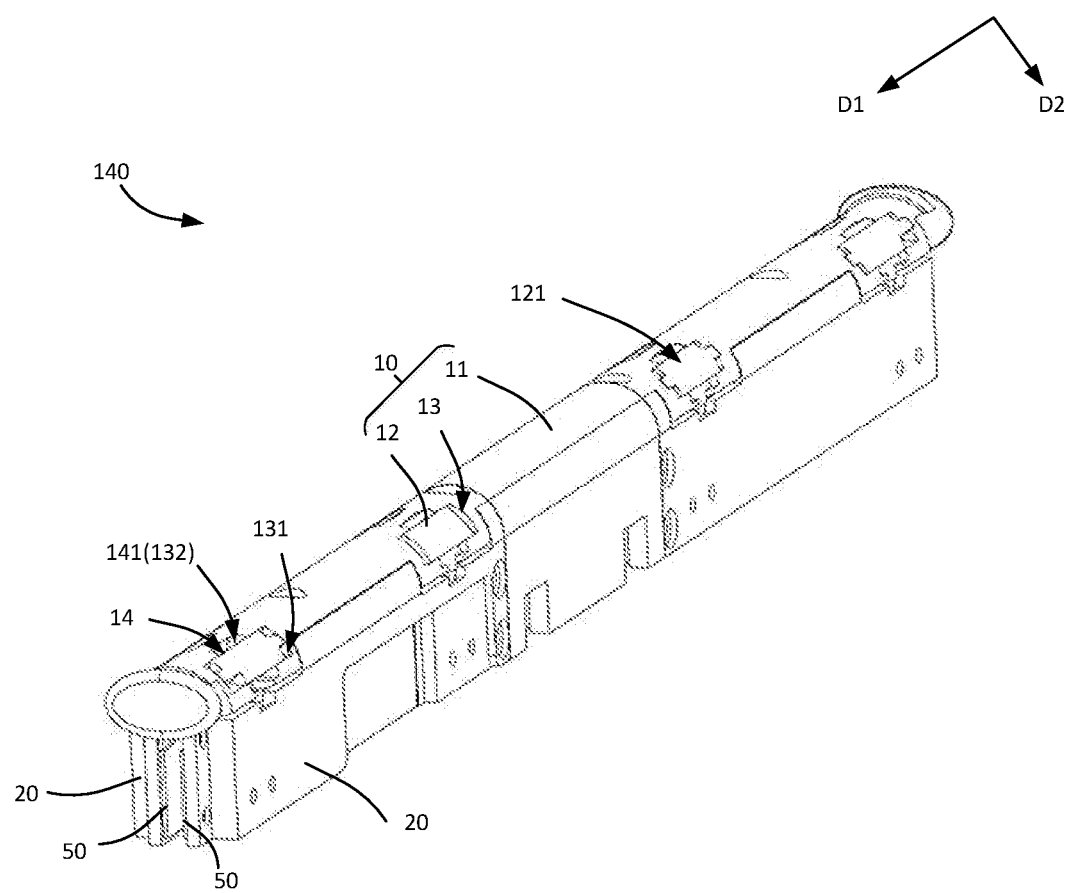
FIG. 4 is a schematic diagram of a foldable hinge shown in FIG. 1 in the folded state.
Figure 5:
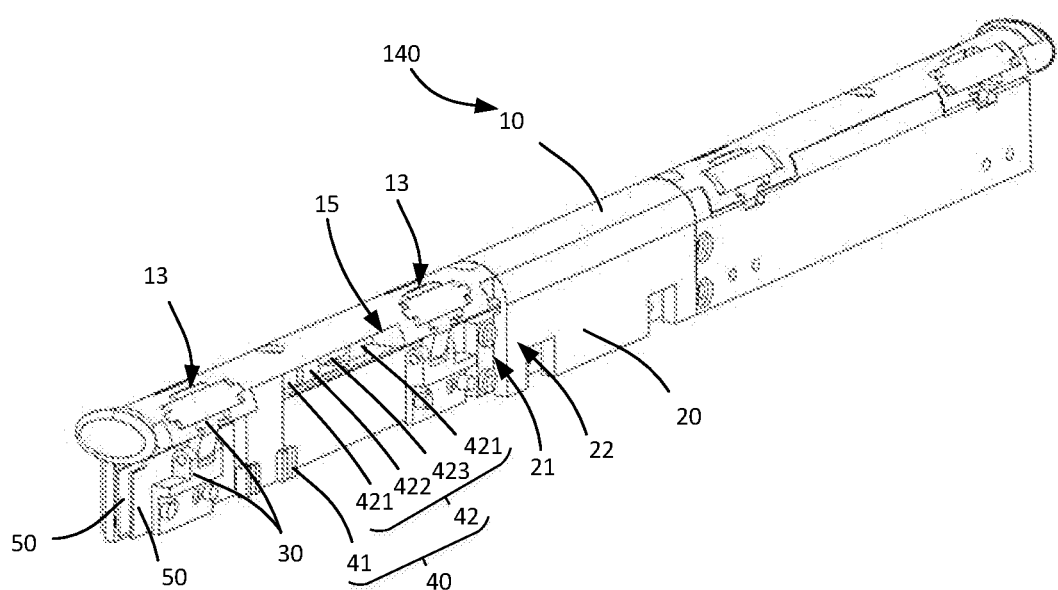
FIG. 5 is a schematic diagram of the foldable hinge in the folded state after removing part of the second support plate.
Figure 6:
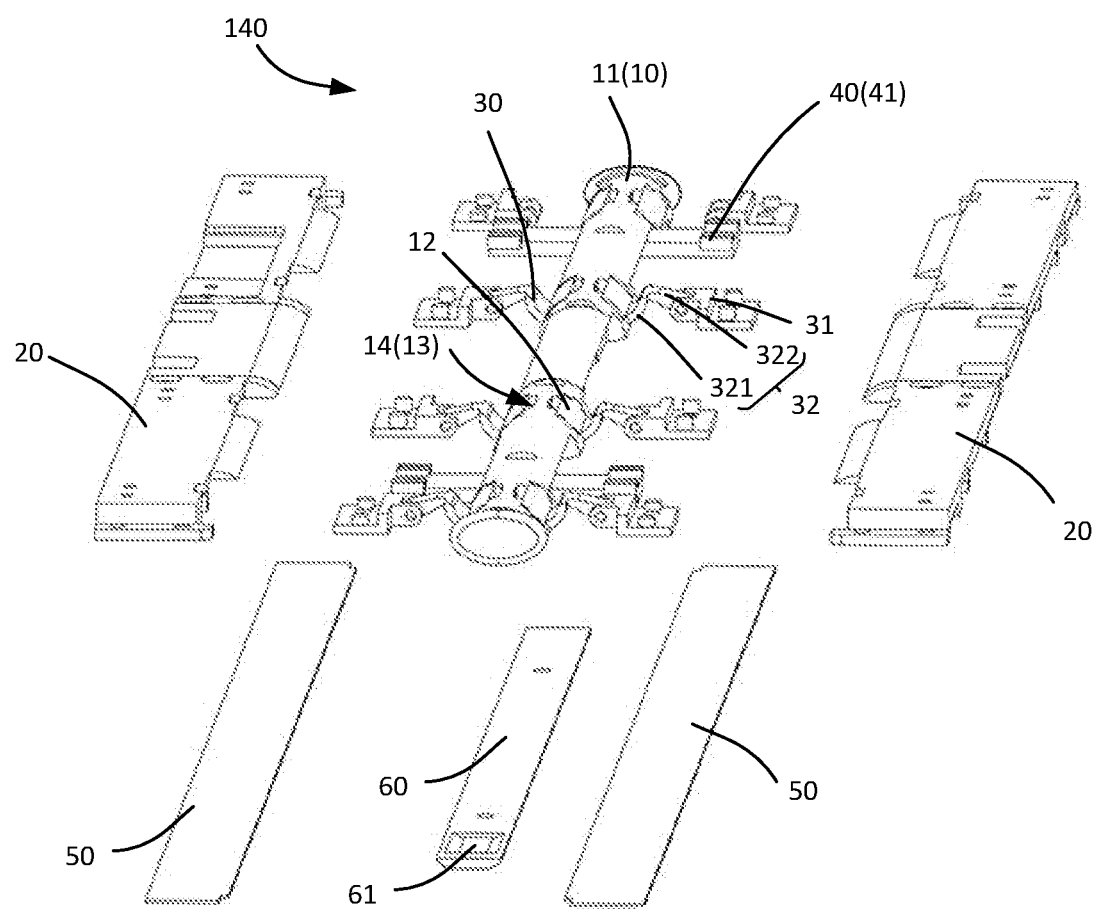
FIG. 6 is an exploded view of the foldable hinge shown in FIG. 4.

Specifically, referring to FIGS. 4-6, the foldable hinge 140 comprises a first support plate 10, two second support plates 20, at least two rotating mechanisms 30, and at least one linkage mechanism 40. The two second support plates 20 are respectively connected to the first support plate 10 through at least two rotation mechanisms 30 and two linkage mechanisms 40. One end of each rotating mechanism 30 is rotatably connected with the first support plate 10, and the other end is fixedly connected with one of the second support plates 20. One end of each linkage mechanism 40 is rotatably connected with the first support plate 10, and the other end is slidably connected with one of the second support plates 20.

Please refer to FIG. 4 again to define a state when the foldable hinge 140 is folded as the second state. When the foldable hinge 140 is in the second state, the first support plate 10 is perpendicular to the second support plates 20.

Please refer to FIG. 6 again to define a state when the foldable hinge 140 is unfolded or flattened as the first state. When the foldable hinge 140 is in the first state, the first support plate 10 is parallel to the second support plates 20.

Please refer to FIG. 4, the first support plate 10 extends along the first direction D1. An outer surface of the first support plate 10 facing the flexible screen 110 is an arc-shaped surface.

In this embodiment, in the first direction D1, the first support plate 10 is in a strip shape, and a cross-sectional area the first support plate 10 is elliptical in the second direction D2 perpendicular to the first direction D1. In other embodiments, the first support plate 10 is not limited to the strip shape and the ellipse shape, and a shape thereof can be set according to implementation conditions, for example, a cross-sectional area thereof can be a circle, a rectangle, a polygon, or the like.

Please refer to FIGS. 4, 7, 8 and 13, the first support plate 10 comprises a first main body portion 11 and at least two limiting blocks 12, and at least two limiting blocks 12 are fixed on the first body part 11. At least two first receiving grooves 13 are provided on the first main body portion 11, and every two of the first receiving grooves 13 are formed in a group and arranged opposite to each other. The two first receiving grooves 13 in the same group are adjacent to each other. Each of the limiting blocks 12 is fixed in one of the first receiving grooves 13, and the gap between each limiting block 12 and an inner wall of the first receiving groove 13 is an arc-shaped groove 14. Each arc-shaped groove 14 has two openings 141 on an outer wall of the first support plate 10.

Figure 14:
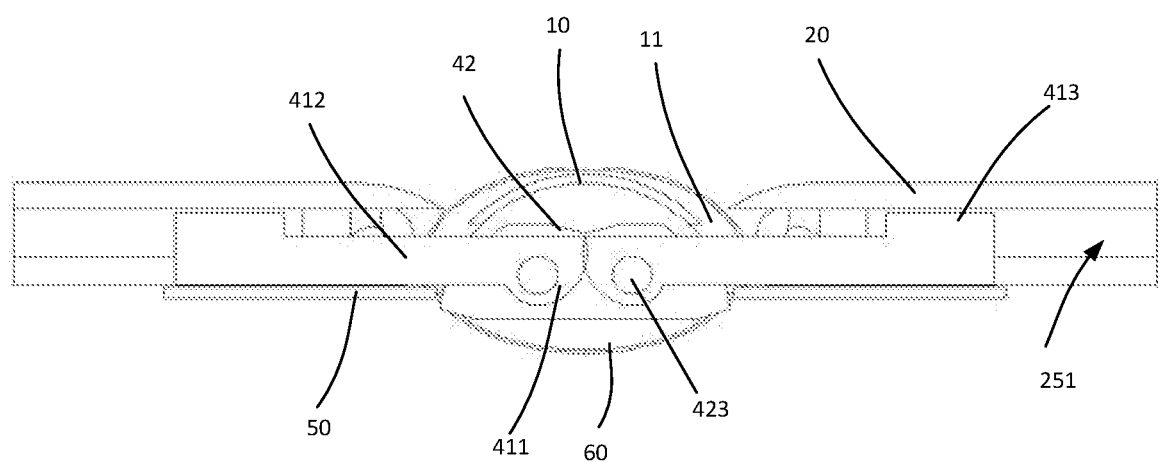
FIG. 14 is a schematic diagram of the linkage mechanism, the first support plate and the second support plate after being assembled and in an unfolded state.

Specifically, referring to FIG. 14, the limiting block 12 comprises a first surface 121 facing the inner wall of the first receiving groove 13, and the first surface 121 is an arc-shaped surface. One end of each rotating mechanism 30 is received in the arc-shaped groove 14. One end of each rotating mechanism 30 enters the arc-shaped groove 14 from the opening 141.

In this embodiment, an outer surface of the limiting block 12 facing the flexible screen 110 is an arc-shaped surface and is level with the outer surface of the first support plate 10 facing the flexible screen 110 to further reduce the unevenness of the outer surface of the first support plate 10 of the foldable hinge 140 facing the flexible screen 110 that the user feels when touching the flexible screen 110 in the bending area 1102.

Specifically, please refer to FIG. 4 again. In this embodiment, the first receiving groove 13 is in a cross shape as a whole and comprises a longitudinal groove 131 extending in the first direction D1 and a transverse groove 132 extending in the second direction D2. The longitudinal groove 131 crosses the transverse groove 132, and the inner wall of the cross section of the longitudinal groove 131 and the transverse groove 132 is arc-shaped. The two ends of the limiting block 12 are respectively fixed to the two ends of the longitudinal groove 131.

Figure 7:
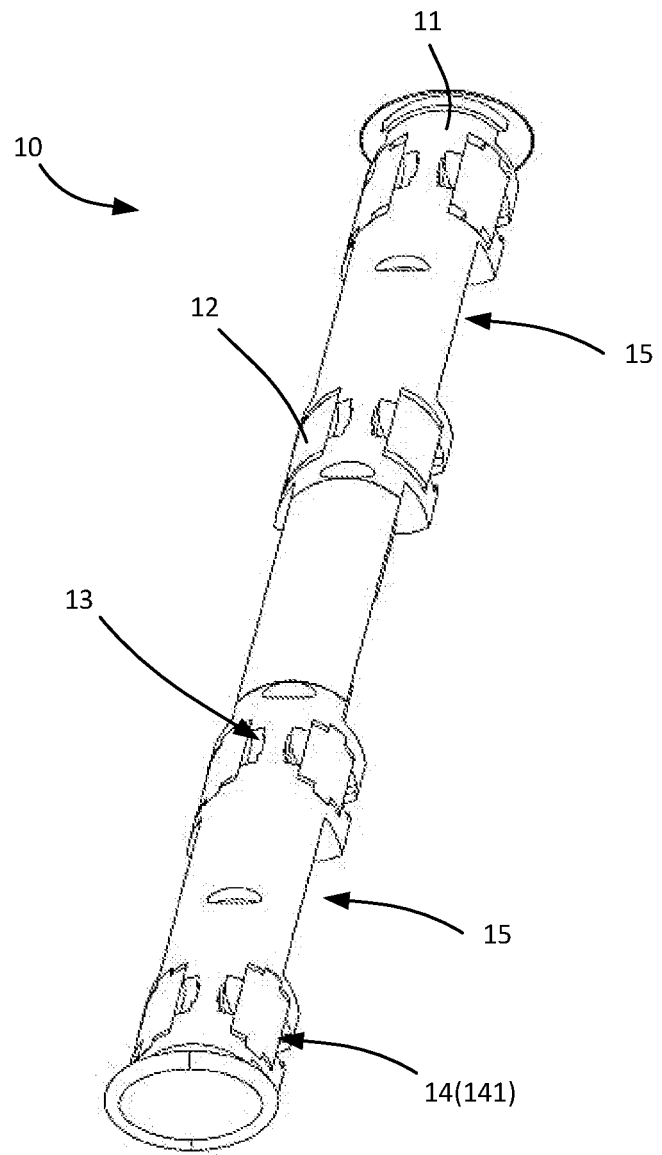
FIG. 7 is an enlarged schematic view of a first support plate of the foldable hinge shown in FIG. 6.
Figure 8:
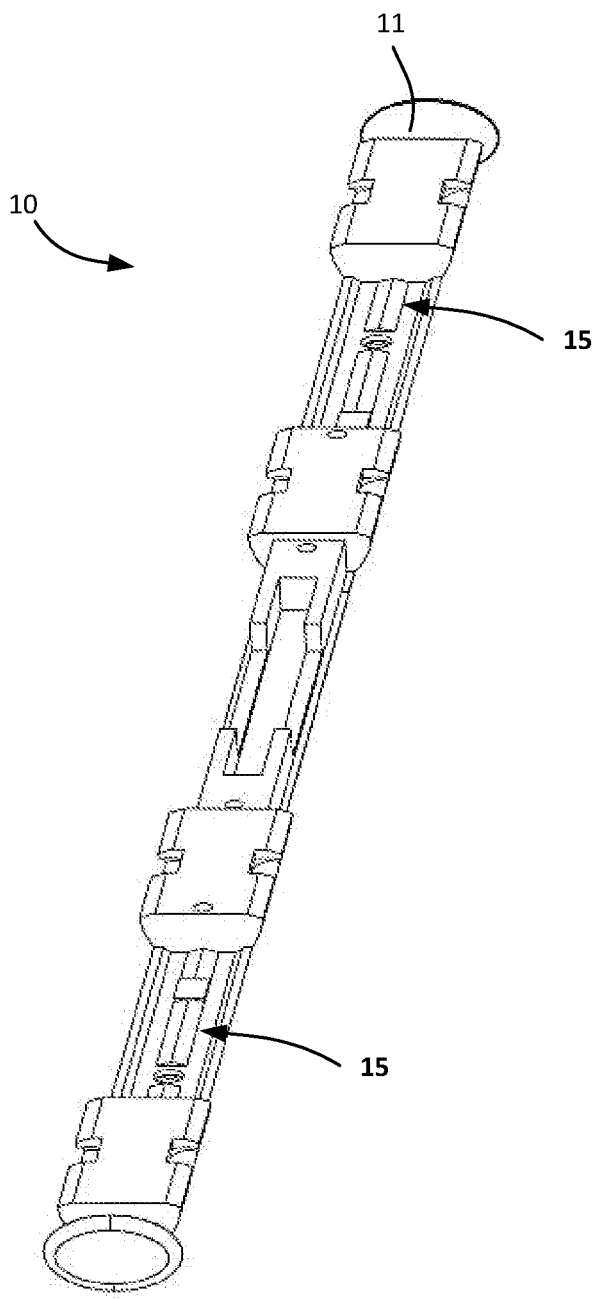
FIG. 8 is an enlarged schematic diagram of the first support plate (turned 180°) shown in FIG. 7.

Specifically, referring to FIG. 7 and FIG. 8 again, the first support plate 10 further comprises at least one second receiving groove 15, and the second receiving groove 15 extends along the first direction D1. In this embodiment, the second receiving groove 15 is located between two groups of the first receiving grooves 13.

In this embodiment, the first support plate 10 is provided with four sets of the first containing grooves 13 and the two second containing grooves 15, and two ends of each of the second containing grooves 15 are respectively provided with two groups of the first receiving grooves 13. In other embodiments, the first receiving grooves 13 and the second receiving grooves 15 on the first support plate 10 are not limited to four groups and two, and can be set according to actual conditions, such as two groups, three groups, five groups, etc. and three, five, etc., which are related to a length of the first support plate 10.

Please refer to FIGS. 2 and 4 again. The ends of the two second support plates 20 away from the first support plate 10 are respectively fixed on the first housing 120 and the second housing 130. The end of the linkage mechanism 40 away from the first support plate 10 is located in the corresponding second support plate 20 and can be positioned and slided on the second support plate 20 relative to the second support plate 20 in the second direction D2.

Figure 9:
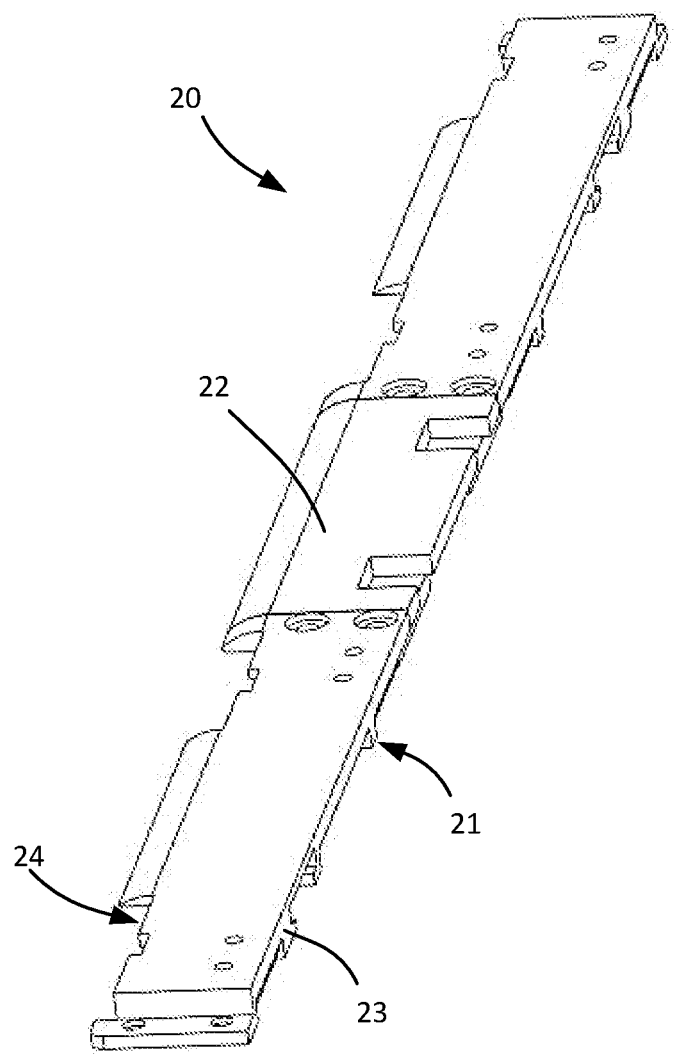
FIG. 9 is an enlarged schematic diagram of a second support plate shown in FIG. 6.
Figure 10:
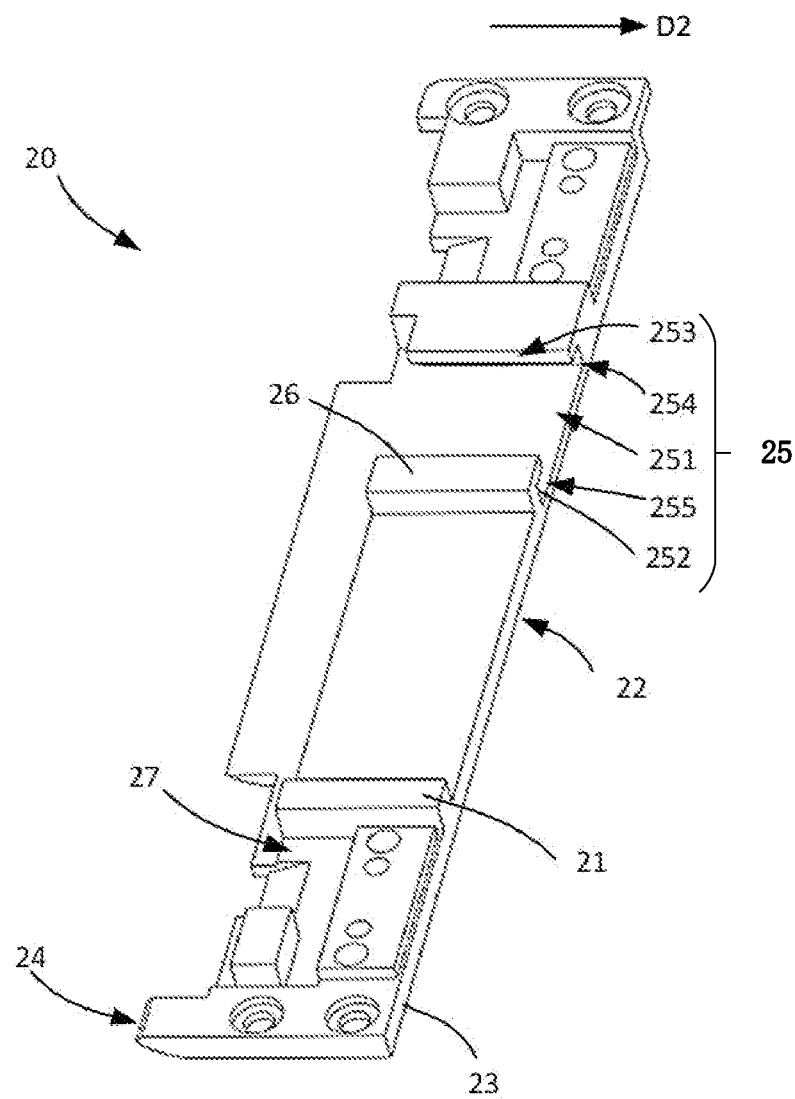
FIG. 10 is an enlarged schematic diagram of the second support plate (turned 180°) shown in FIG. 9.
Figure 11:
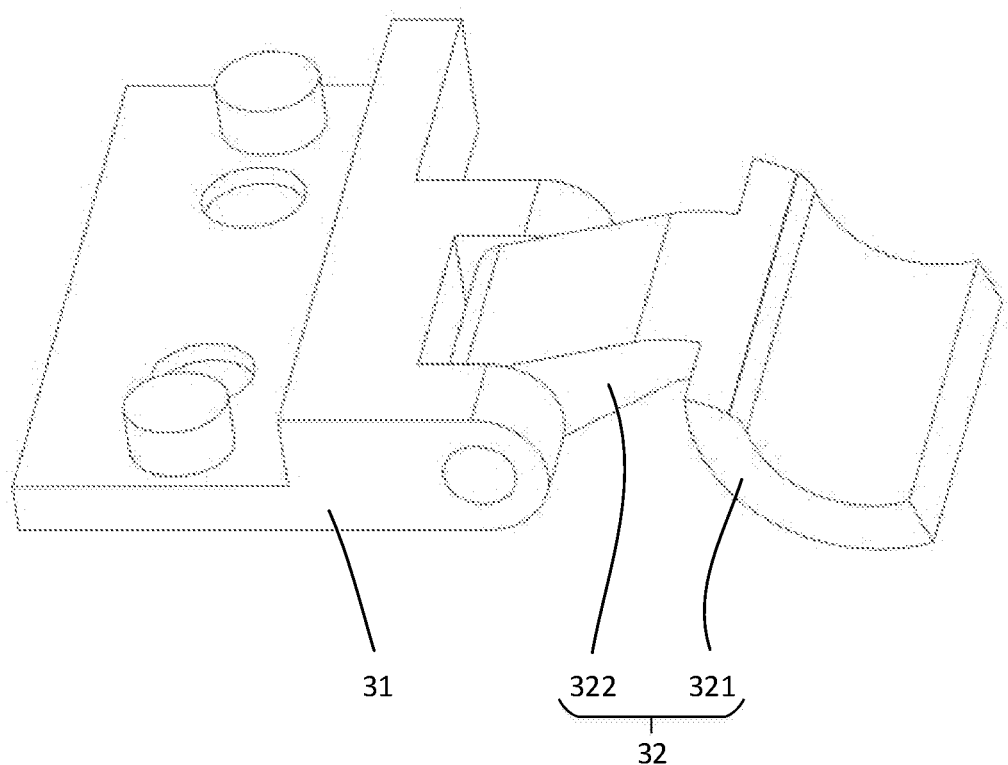
FIG. 11 is an enlarged schematic diagram of a rotating mechanism shown in FIG. 6.
Figure 12:
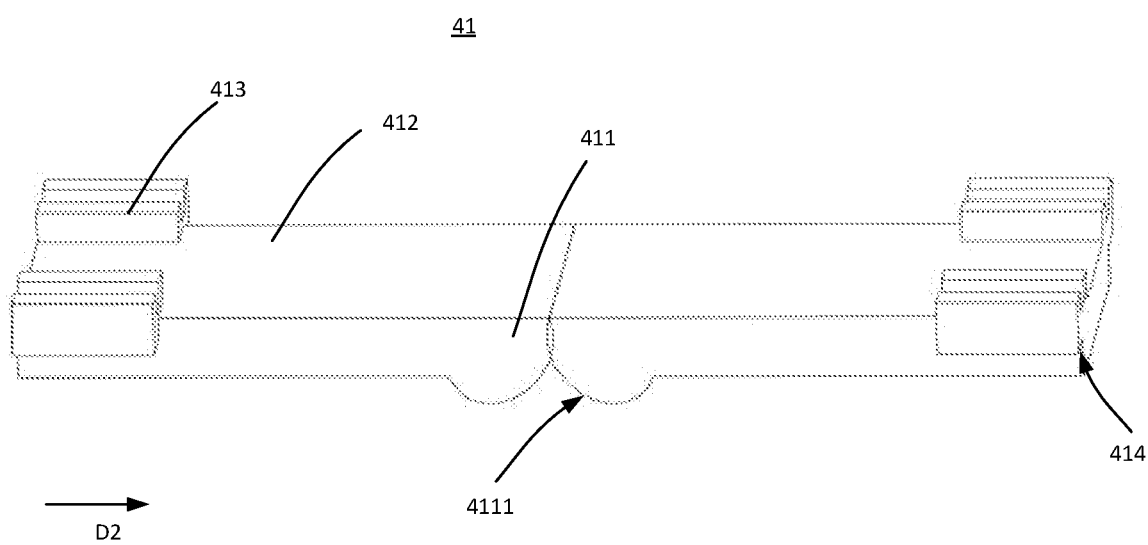
FIG. 12 is an enlarged schematic diagram of a linkage arm of the linkage mechanism shown in FIG. 6.

Specifically, referring to FIGS. 9 and 10, each of the second support plates 20 comprises a second surface 21 facing the linkage mechanism 40, and a third surface 22 opposite and arranged in parallel to the second surface 21, a first side surface 23 perpendicularly connected to the second surface 21 and the third surface 22, and a second side surface 24 perpendicularly connected to the second surface 21 and the third surface 22 and opposite to the first side surface.

At least one sliding groove 25 extending along the second direction D2 is formed on each of the second support plates 20. The sliding groove 25 penetrates the first side surface 23, the second side surface 24 and the second surface 21. Each sliding groove 25 comprises a bottom wall 251 parallel to the second surface 21 and two sidewalls 252 perpendicularly connected to the bottom wall 251. The sidewalls 252 extend along the second direction D2.

Herein, the sidewall 252 of each sliding groove 25 is further provided with two opposite guide ribs 26 which are arranged in parallel, and the two guide ribs 26 extend oppositely from the side wall 252. There a gap 253 is provided between the two guide ribs 26. A first sub-sliding groove 254 is provided between one of the guide ribs 26 and the bottom wall 251, and a second sub-sliding groove 255 is provided between the other guide rib 26 and the bottom wall 251. The gap 253, the first sub-sliding groove 254, and the second sub-sliding groove 255 are all a portion of the sliding groove 25. The first sub-sliding groove 254 and the second sub-sliding groove 255 are located on both sides of the gap 253. The gap 253, the first sub-sliding groove 254 and the second sub-sliding groove 255 are communicated with each other.

In this embodiment, the guide rib 26 and the sidewall 252 of the sliding groove 25 are integrally formed, that is, the guide rib 26 is a portion of the second support plate 20.

In other embodiments, the guide rib 26 may also be fixedly connected to the sidewall 252 of the sliding groove 25 by pins, glue, etc., that is, the guide rib 26 and the second support plate 20 are two portions independent form each other.

Herein, at least one third receiving groove 27 is formed on each of the second support plates 20, and the third receiving groove 27 is located at one end of the sliding groove 25 and is recessed from the second surface 21 to the third surface 22. The third receiving groove 27 is used for receiving a fixed plate 31 of the rotating mechanism 30 (see below).

Please refer to FIG. 5 again, one end of the linkage mechanism 40 away from the first support plate 10 is received in the sliding groove 25, and one of the sliding grooves 25 on one of the second support plates 20 is opposite to one of the sliding grooves 25 of the other one of the second support plates 20.

Herein, the number of the sliding grooves 25 on each of the second support plates 20 is the same as the number of the second receiving grooves 15. That is, two sides of one second receiving groove 15 correspond to one sliding groove 25 respectively.

Specifically, referring to FIGS. 6, 7, 10, 11, and 13, each of the rotating mechanisms 30 comprises a fixed plate 31 and an arc-shaped connection portion 32 that is rotatably connected to the fixed plate 31. One end of the fixing plate 31 is fixed in the third receiving groove 27 on the corresponding second support plate 20, and the other end is rotatably connected to the corresponding arc-shaped connection portion 32.

Herein, each of the arc-shaped connection portions 32 comprises an arc-shaped arm 321 and a handle 322 connected to one end of the arc-shaped arm 321. The arc-shaped arm 321 is rotatably connected to the fixing plate 31 through the handle 322, and an end of the arc-shaped arm 321 away from the handle 322 extends into and is received in the arc-shaped groove 14. The arc-shaped arm 321 can rotate around a rotation center and can slide in the arc-shaped groove 14. An arc of the arc-shaped arm 321 is consistent with an arc of the arc-shaped groove 14, that is, a center of the arc-shaped groove 14 is the same as the rotation center of the arc-shaped arm 321. By setting the position of the rotation center, the flexible screen 110 can be prevented from being stretched by the foldable hinge 140 during the folding or unfolding processes.

When the foldable hinge 140 is unfolded or flattened, a portion of the arc-shaped arm 321 is still received in the arc-shaped groove 14. The arc-shaped groove 14, the arc-shaped arm 321, and the fixing plate 31 cooperate to rotatably connect the second support plate 20 to the first support plate 10, so that the second support plate 20 can be relatively folded or unfolded relative to the first support plate 10. Therefore, the flexible screen 110 is not stretched by the foldable hinge 140 during the folding or unfolding processes.

In this embodiment, the handle 322 extends from an end of the arc-shaped arm 321 away from the first support plate 10. That is, in this embodiment, the handle 322 and the arc-shaped arm 321 are integrally formed. In other embodiments, the handle 322 may also be fixedly connected to the arc-shaped arm 321 by a pin, a pin shaft, glue, or the like.

In this embodiment, the fixing plate 31 is movably connected to the handle 322 via a pin shaft. In other embodiments, the fixing plate 31 can also be fixed or movably connected to the handle 322 by a pin, glue, or the like.

In this embodiment, the fixing plate 31 is fixedly connected to the second support plate 20 by a pin shaft. In other embodiments, the fixing plate 31 may also be fixedly connected to the second support plate 20 by glue or the like.

Please refer to FIGS. 5, 12, 14 and 15, each of the linkage mechanisms 40 comprises two linkage arms 41 and a synchronous gear assembly 42, the two linkage arms 41 are fixedly connected to the synchronous gear assembly 42, the synchronous gear assembly 42 is fixed in the second receiving groove 15 of the first support plate 10 and is used to drive the two linkage arms 41 to fold or unfold synchronously, and the two linkage arms 41 drive the two second support plates 20 to folded or unfolded synchronously.

Specifically, each of the linkage arms 41 comprises a fixed connection portion 411 and a linkage portion 412 connected to the fixed connection portion 411.

Herein, when the foldable hinge 140 is unfolded or flattened, the fixed connection portions 411 of the two linkage arms 41 abut against each other, so that the two linkage arms 41 cannot continue to rotate in the foldable direction (that is, an expansion angle of the two linkage arms 41 does not exceed 180°), which can prevent the two second support plates 20 from being folded inward in the reverse direction. With this structure, a user can prevent the foldable hinge 140 from being folded inward by mistake, which causes damage to the flexible screen 110 and the foldable hinge 140.

Optionally, in an embodiment of the present application, the fixed connection portion 411 comprises an arc-shaped surface 4111. The arc-shaped surface 4111 of the fixed connection portion 411 can make the fixed connection portions 411 of the two linkage arms 41 avoid each other during the opposite folding process, so as to smoothly realize the opposite folding.

In this embodiment, the fixed connection portion 411 and the linkage portion 412 are integrally formed. In other embodiments, the fixed connection portion 411 and the linkage portion 412 may also be two independent parts that are fixedly connected.

Herein, each of the linkage arms 41 further comprises two convex portions 413 oppositely disposed at one end of the linkage portion 412 far away from the fixed connection portion 411. The two convex portions 413 are located on the surface of the linkage portion 412 facing the second support plate 20 and protrude from a side surface of the linkage portion 412 parallel to the second direction D2. That is, each convex portion 413 forms a step 414 with the adjacent linkage portion 412 respectively, and the step 414 is L-shaped.

When an end of the linkage portion 412 away from the fixed connection portion 411 is embedded in the sliding groove 25, the two convex portions 413 are received in the first sub-sliding groove 254 and the second sub-sliding groove 255, respectively, an end of the linkage portion 412 away from the fixed connection portion 411 is received in the gap 253. The linkage portion 412 can be slided in the gap 253, and the two convex portions 413 are slided in the corresponding first sub-sliding groove 254 and the second sub-sliding groove 255 respectively.

Herein, the synchronous gear assembly 42 comprises two gear brackets 421 arranged oppositely in the second receiving groove 15, two synchronous gears 422, and two fixed shafts 423. Each of the synchronous gears 422 is fixedly connected to one of the fixed shafts 423, and two gear brackets 421 are fixed on the inner wall of the second receiving groove 15. Both ends of the fixed shaft 423 are respectively rotatably connected to the two gear brackets 421 and penetrate through the two gear brackets 421. One of the synchronous gears 422 is fixedly connected to one of the fixed shafts 423, and one of the linkage arms 41 is fixedly connected to a corresponding fixed shaft 423.

Herein, the two synchronizing gears 422 meshing with each other cooperate with the fixed shaft 423 to drive the two oppositely disposed linkage arms 41 to always rotate symmetrically, and then cooperate with the linkage portion 412 and the convex portion 413 of the two linkage arms 41 and the sliding groove 25 on the second support plate 20 so as to drive the two second support plates 20 on both sides of the first support plate 10 to always maintain symmetrical rotation.

Optionally, in one embodiment of the present application, each linkage mechanism 40 further comprises a driving member (not shown), and the driving member is used to drive one of the synchronous gears 422 to rotate clockwise or counterclockwise. The two synchronous gears 422 mesh with each other. Therefore, the other synchronous gear 422 rotates counterclockwise or clockwise, thereby driving the two second support plates 20 to unfold or fold synchronously.

Please refer to FIGS. 6 and 14 again, the foldable hinge 140 further comprises two side bottom plates 50 and a bottom plate 60. Each side bottom plate 50 is fixed on one of the second support plates 20 and covers the sliding groove 25 and the fixing plate 31 to protect the linkage portion 412 of the linkage arm 41 in the sliding groove 25 and the fixing plate 31 fixed on the second support plate 20. The bottom plate 60 is fixed on the first support plate 10, and is located between the two linkage mechanisms 40, and covers the second receiving groove 15 to protect the synchronous of the gear assembly 42 and part of the linkage arm 41 in the second receiving groove 15. At least one end of the bottom plate 60 is formed with an escape groove 61, and the escape groove 61 faces the fixed connection portion 411 of the linkage arm 41 to avoid the fixed connection portion 411 when the fixed connection portion 411 is unfolded or folded.

Figure 13:
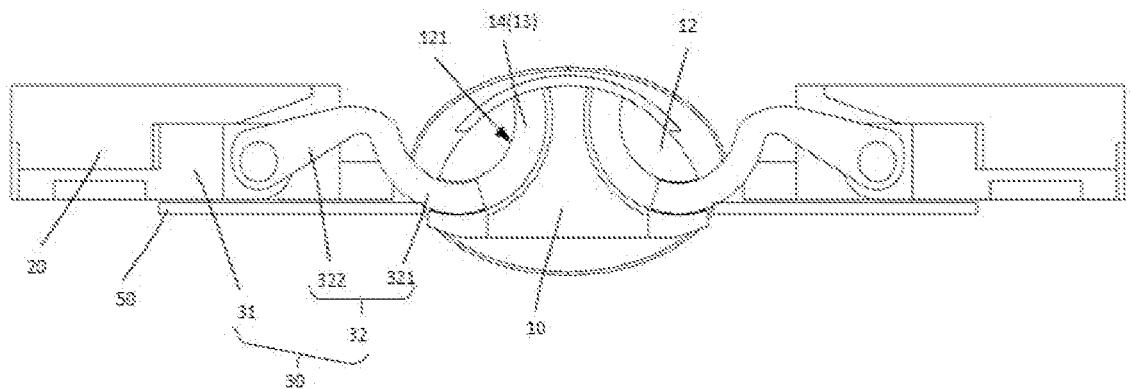
FIG. 13 is a schematic diagram of the rotating mechanism, the first support plate and the second support plate after being assembled and in an unfolded state.

Please refer to FIGS. 13 and 14, when the foldable hinge 140 is in the first state (the foldable hinge 140 is unfolded or flattened), the first support plate 10 and the two second support plates 20 are on a same plane. That is, the first support plate 10 is parallel to the two second support plates 20. A part of the arc-shaped arm 321 of the arc-shaped connection portion 32 of the rotating mechanism 30 is received in the arc-shaped groove 14, the other part of the arc-shaped arm 321 of the arc-shaped connection portion 32 of the rotating mechanism 30 is located outside the arc-shaped groove 14. The fixed connection portions of the linkage arms 41 of the two opposite linkage mechanisms 40 411 abuts, the end of the linkage portion 412 of the linkage arm 41 that is away from the first support plate 10 is located at the end of the sliding groove 25 that is close to the first support plate 10.

Figure 15:
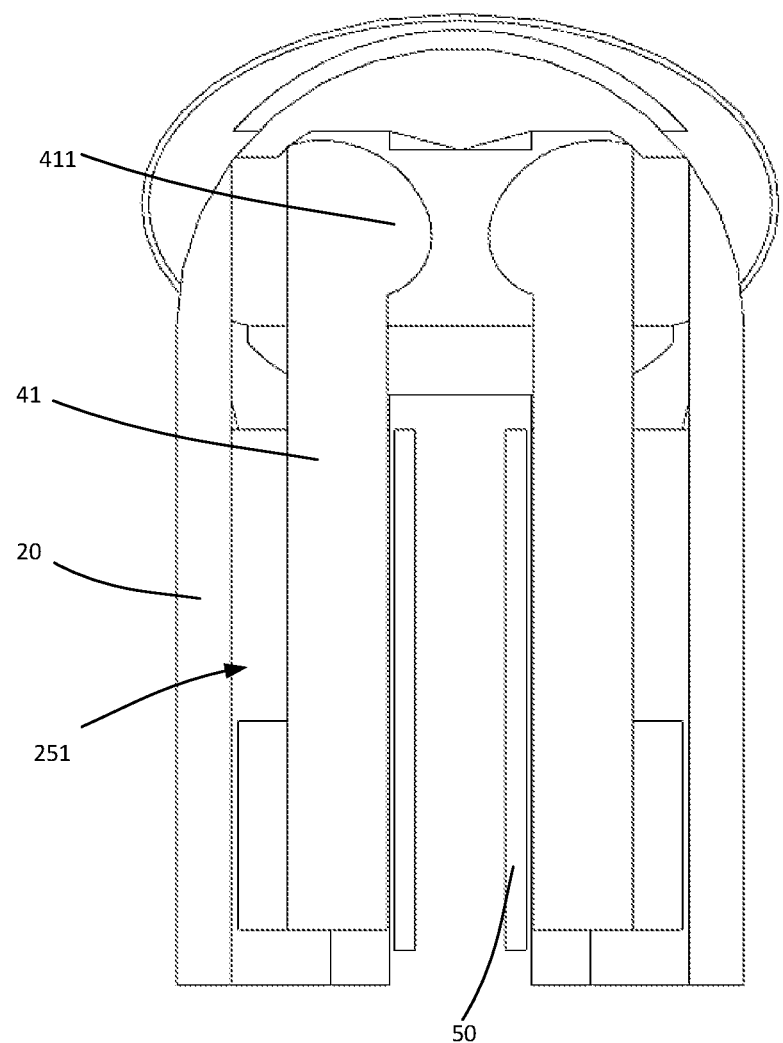
FIG. 15 is a schematic diagram of the linkage mechanism, the first support plate and the second support plate after being assembled and in a folded state.

Please refer to FIGS. 4, 5 and 15, when the foldable hinge 140 is in the second state (i.e. the foldable hinge 140 is folded), the two second support plates 20 are parallel to each other and both are perpendicular to the first support plate 10. The arc-shaped arms 321 of the arc-shaped connection portion 32 of the rotating mechanism 30 are all received in the arc-shaped groove 14. The fixed connection portions 411 of the linkage arms 41 of the two opposite linkage mechanisms 40 are separated, the end of the linkage portion 412 of the linkage arm 41 that is away from the first support plate 10 is located at the end of the sliding groove 25 that is away from the first support plate 10, and the two linkage mechanisms 40 are opposite to each other. The linkage arms 41 are parallel to each other.

Optionally, in one embodiment of the present application, the foldable display device 100 further comprises a gasket 150 located between the flexible screen 110 and the foldable hinge 140. The gasket 150 has certain rigidity, which can eliminate unevenness of the arc-shaped surface of the first support plate 10 of the foldable hinge 140 facing the flexible screen 110 sensed by an user when touching the flexible screen 110 in the bending area 1102.

In the foldable hinge and foldable display device provided by the present application, the foldable hinge comprises a first support plate 10 and two second support plates 20 located on both sides of the first support plate 10, and through at least one set of two rotating mechanisms 30 connection the two second support plates 20 and the first support plate 10, at least a set of two arc-shaped grooves 14 are provided on the first support plate 10. Each rotating mechanism 30 comprises an arc-shaped arm 321. The arc-shaped arm 321 is received and slided in the arc-shaped groove 14. The arc-shaped groove 14 on the first support plate 10 and the arc-shaped arm 321 of the rotating mechanism 30 cooperate with each other, so that the flexible screen 110 is not stretched by the foldable hinge 140 in the folding or unfolding process. At least one sliding groove 25 is also provided on each second support plate 20, and the foldable hinge 140 further comprises a linkage mechanism 40. The linkage mechanism 40 comprises a linkage arm 41 and a synchronous gear assembly 42. The two linkage arms 41 are fixedly connected to the synchronous gear assembly 42. The other end of the linkage arm 41 is slidably connected in the sliding groove 25 and can be slided in the sliding groove 25. The synchronous gear assembly 42 drives the two oppositely arranged linkage arms 41 to always rotate symmetrically, and then cooperate with the sliding connection between the other end of the linkage arm 41 and the sliding groove 25, so that the two second support plates 20 on both sides of the first support plate 10 always keep symmetrical rotation. When the foldable hinge 140 is unfolded or flattened, the fixed connection portions 411 of the two linkage arms 41 abut each other, so that the two linkage arms 41 cannot continue to rotate in the inward foldable direction (that is, the expansion angle of the two linkage arms 41 does not exceed 180°), thereby preventing the two second support plates 20 from be folded inward in the reverse direction.

With this structure, the user can prevent the foldable hinge 140 from being folded in by mistake, causing damage to the flexible screen 110 and the foldable hinge 140. The first support plate the two second support plates 20, the rotation mechanism 30, and the linkage mechanism cooperate with each other. When the foldable hinge 140 is unfolded or flattened, the first support plate 10 and the two second support plates 20 can jointly support the flexible screen. When the foldable hinge 140 is folded, the first support plate 10 and the two second support plates 20 are U-shaped. The first support plate 10 and the two second support plates 20 can still be attached to the bottom of the flexible screen 110. During the folding process, the flexible screen 110 is not greatly stretched and is mechanically supported.

Specific examples are used in this article to illustrate the principles and implementation of the present application. Its core idea, at the same time, for those skilled in the art, according to the idea of the present application, there will be changes in the specific implementation and scope of application. In summary, the content of the present specification should not be construed as a limitation to the present application.

What is claimed is:
1. A foldable hinge, comprising:
a first support plate, wherein the first support plate is provided with at least two opposite arc-shaped grooves;
two second support plates located on opposite sides of the first support plate; and
at least two rotating mechanisms, wherein each of the rotating mechanisms comprises:
a fixed plate, wherein one end of the fixed plate away from the arc-shaped arm is fixed on one of the second support plates; and
an arc-shaped arm connected to the fixed plate, wherein the arc-shaped arm is at least partially received and slided in the arc-shaped groove to drive the corresponding second support plate being unfolded or folded relative to the first support plate, wherein the first support plate comprises:
a first main body, wherein the first main body is provided with at least two opposite first receiving grooves; and
at least two limiting blocks, wherein each limiting block is fixed in one of the first receiving grooves, and a between each limiting block and an inner wall of the first receiving, groove forms the arc-shaped groove.

2. The foldable hinge of claim 1, wherein the foldable hinge further comprises at least one linkage mechanism, wherein the linkage mechanism comprises two linkage arms and a synchronous gear assembly, the synchronous gear assembly is fixed on the first support plate, and the synchronous gear assembly comprises two synchronous gears meshing with each other, wherein one end of each of the linkage arms is slidably connected to one of the second support plates on the same side, the other end each of the linkage arms is fixedly connected to the corresponding synchronous gear, and the two linkage arms rotate synchronously with the synchronous gear.

3. The foldable hinge of claim 2, wherein the ends of the two linkage anus away from the second support plate abut against each other.

4. The foldable hinge of claim 3, wherein an end surface of each of the linkage arms away from the second support plate is arc-shaped.

5. The foldable hinge according to claim 2, wherein each of the second support plates is provided with a sliding groove, an end of each of the linkage arms away from the first support plate is embedded in the sliding groove and is able to slide in the sliding groove under driving of the synchronous gear.

6. The foldable hinge according to claim 5, wherein each of the linkage arms comprises a linkage portion and two convex portions oppositely disposed at an end of the linkage portion away from the first support plate,
wherein two guide ribs are provided on two sidewalls of the sliding groove, the two guide ribs respectively extend oppositely from the two sidewalls, an opening is formed between the two guide ribs, a first sub-sliding groove is formed between one of the guide ribs and a bottom wall of the sliding groove, and a second sub-sliding groove is formed between the other one of the guide ribs and the bottom wall; and
wherein the two convex portions are respectively received in the first sub-sliding groove and the second sub-sliding groove, an end of the linkage portion away from the first support plate is received in the opening, the linkage portion is able to slide in the opening; and each convex portion is able to slide in the corresponding first sub-sliding groove or the second sub-sliding groove.

7. The foldable hinge according to claim 5, wherein a second receiving groove is further provided on the first support plate, and the synchronous gear assembly further comprises:
two gear brackets arranged oppositely, wherein the two gear brackets are fixed on the inner wall of the second receiving groove; and
two fixed shafts, wherein both ends of the fixed shafts are respectively rotatably connected to the two gear brackets, each of the synchronous gears is fixedly connected to one of the fixed shafts, and one of the linkage arms is fixedly connected to one of the correspond fixed shafts.

8. The foldable hinge of claim 2, further comprising two bottom side plates and a bottom plate, each of the bottom side plates is fixed on one of the second support plates and covers the sliding groove and the fixed plate, and the bottom plate is fixed on the first support plate and covers the second receiving groove.

9. The foldable hinge of claim 2, wherein each of the linkage mechanisms further comprises a driving member, and the driving member is connected to one of the synchronous gears and is used to drive the synchronous gear to rotate.

10. The foldable hinge of claim 1, wherein each of the first receiving grooves comprises:
a longitudinal groove extending in a first direction; and
a transverse groove extending in a second direction, wherein the longitudinal groove crosses the transverse groove, an inner wall at a cross-section of the longitudinal groove and the transverse groove is arc-shaped, and the limiting block is received and fixed in the longitudinal groove,
wherein each of the limiting blocks comprises a first surface facing the inner wall of the first receiving groove, the first surface is an arc-shaped surface, the arc-shaped inner wall of the first receiving groove and the arc-shaped first surface of the first limiting block constitutes two arc-shaped surfaces of the arc-shaped groove.

11. The foldable hinge of claim 10, wherein each of the limiting block further comprises an outer surface opposite to the first surface, the outer surface of the limiting block is arc-shaped, the outer surface of the first support plate is arc-shaped, an arc of the outer surface of the limiting block is consistent with an arc of the outer surface of the first support plate, and the outer surface of the stop block is level with the outer surface of the first support plate.

12. The foldable hinge of claim 1, wherein the arc-shaped groove is provided with two openings on the outer surface of the first support plate, and one end of the arc-shaped arm enters the arc-shaped groove.

13. The foldable hinge of claim 1, wherein an arc of the arc-shaped arm is the same as an arc of the arc-shaped groove, and a rotation center of the arc-shaped arm is a center of the arc-shaped groove.

14. A foldable display device, comprising:
a foldable hinges, comprising:
a first support plate, wherein the first support plate is provided with at least two opposite arc-shaped grooves;
two second support plates located on opposite sides of the first support plate; and
at least two rotating mechanisms, wherein each of the rotating mechanisms comprises:
a fixed plate, wherein one end of the fixed plate away from the arc-shaped arm is fixed on one of the second support plates; and
an arc-shaped arm connected to the fixed plate, wherein the arc-shaped arm is at least partially received and slided in the arc-shaped groove to drive the corresponding second support plate being unfolded or folded relative to the first support plate;
a flexible screen located on one side of the foldable hinge, wherein the flexible screen comprises a bending area, and the foldable hinge is facing the bending area; and
a shell, wherein the flexible screen and the foldable hinge are respectively fixed on the shell.

15. The foldable display device of claim 14, further comprising:
a gasket located between the flexible screen and the foldable hinge.

16. The foldable display device of claim 14, wherein the first support plate comprises:
a first main body, wherein the first main body is provided with at least two opposite first receiving grooves; and
at least two limiting blocks, wherein each limiting block is fixed in one of the first receiving grooves, and a gap between each limiting block and an inner wall of the first receiving groove forms the arc-shaped groove.

17. The foldable display device of claim 14, wherein the foldable hinge further comprises at least one linkage mechanism, wherein the linkage mechanism comprises two linkage arms and a synchronous gear assembly, the synchronous gear assembly is fixed on the first support plate, and the synchronous gear assembly comprises two synchronous gears meshing with each other, wherein one end of each of the linkage arms is slidably connected to one of the second support plates on the same side, the other end each of the linkage arms is fixedly connected to the corresponding synchronous gear, and the two linkage arms rotate synchronously with the synchronous gear.

18. The foldable display device of claim 17, wherein the ends of the two linkage arms away from the second support plate abut against each other.

19. The foldable display device of claim 17, wherein each of the second support plates is provided with a sliding groove, an end of each of the linkage arms away from the first support plate is embedded in the sliding groove and is able to slide in the sliding groove under driving of the synchronous gear, each of the linkage arms comprises a linkage portion and two convex portions oppositely disposed at an end of the linkage portion away from the first support plate, wherein two guide ribs are provided on two sidewalls of the sliding groove, the two guide ribs respectively extend oppositely from the two sidewalls, an opening is formed between the two guide ribs, a first sub-sliding groove is formed between one of the guide ribs and a bottom wall of the sliding groove, and a second sub-sliding groove is formed between the other one of the guide ribs and the bottom wall; and wherein the two convex portions are respectively received in the first sub-sliding groove and the second sub-sliding groove, an end of the linkage portion away from the first support plate is received in the opening, the linkage portion is able to slide in the opening, and each convex portion is able to slide in the corresponding first sub-sliding groove or the second sub-sliding groove.

20. A foldable hinge, comprising:

a first support plate, wherein the first support plate is provided with at least two opposite arc-shaped grooves;

two second support plates located on opposite sides of the first support plate; and at least two rotating mechanisms, wherein each of the rotating mechanisms comprises:

a fixed plate, wherein one end of the fixed plate away from the arc-shaped arm is fixed on one of the second support plates; and an arc-shaped arm connected to the fixed plate, wherein the arc-shaped arm is at least partially received and slided in the arc-shaped groove to drive the corresponding second support plate being unfolded or folded relative to the first support plate, wherein the foldable hinge further comprises at least one linkage mechanism, wherein the linkage mechanism comprises two linkage arms and a synchronous gear assembly, the synchronous gear assembly is fixed on the first support plate, and the synchronous gear assembly comprises two synchronous gears meshing with each other, wherein one end of each of the linkage arms is slidably connected to one of the second support plates on the same side, the other end each of the linkage arms is fixedly connected to the corresponding synchronous gear, and the two linkage arms rotate synchronously with the synchronous gear.

* * * * *